United States Patent [19]

Kojima et al.

[11] Patent Number: 4,847,358
[45] Date of Patent: Jul. 11, 1989

[54] PROCESS FOR PRODUCING POLYAMIDE ACID HAVING SILOXANE BONDS AND POLYIMIDE HAVING SILOXANE BONDS AND ISOINDOLOQUINAZOLINEDIONE RINGS

[75] Inventors: Mitsumasa Kojima; Takayuki Saito; Toul Kikuchi; Shun-ichiro Uchimura, all of Hitachi, Japan; Hidetaka Satou, Cupertino, Calif.; Daisuke Makino, Hitachi, Japan

[73] Assignee: Hitachi Chemical Company, Ltd., Tokyo, Japan

[21] Appl. No.: 86,892

[22] Filed: Aug. 18, 1987

[30] Foreign Application Priority Data

Sep. 19, 1986 [JP] Japan .................. 61-221187
Sep. 19, 1986 [JP] Japan .................. 61-221188

[51] Int. Cl.$^4$ ............................. C08G 69/26
[52] U.S. Cl. .......................... 528/353; 528/125; 528/126; 528/128; 528/172; 528/185; 528/188; 528/352
[58] Field of Search ............... 528/125, 126, 128, 172, 528/185, 188, 352, 353

[56] References Cited

U.S. PATENT DOCUMENTS 4,588,804  5/1986  Frud .................. 528/353

*Primary Examiner*—John Kight
*Assistant Examiner*—M. L. Moore
*Attorney, Agent, or Firm*—Frishauf, Holtz, Goodman & Woodward

[57] ABSTRACT

There are disclosed a process for producing a polyamide acid having at least one siloxane bond, which comprises carrying out the reaction of:

(a) a tetracarboxylic dianhydride having at least one siloxane bond of the formula:

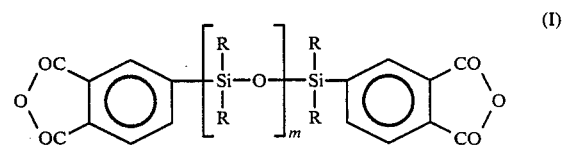

(I)

wherein R represents a monovalent hydrocarbon group and m is an integer of 1 or more;

(b) a diamine; and (c) a diaminoamide compound of the formula (II):

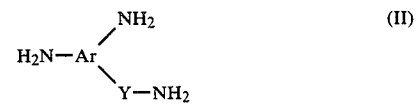

(II)

wherein Ar represents an aromatic residue, Y represents $SO_2$ or CO, and one amino group and Y—$YNH_2$ are positioned in ortho-position to each other, and optinal presence of (d) an aromatic tetracarboxylic dianhydride;

with the total amount of the diamine and the diaminoamide compound and the total amount of the tetracarboxylic dianhydride of the formula (I) and the aromatic tetracarboxylic dianhydride optionally contained being substantially equal moles;

and a process for producing a polyimide having at least one siloxane bond and at least one isoindoloquinazolinedione ring, which comprises further heating the resulting polyamide acid to dehydration ring closure.

12 Claims, 2 Drawing Sheets

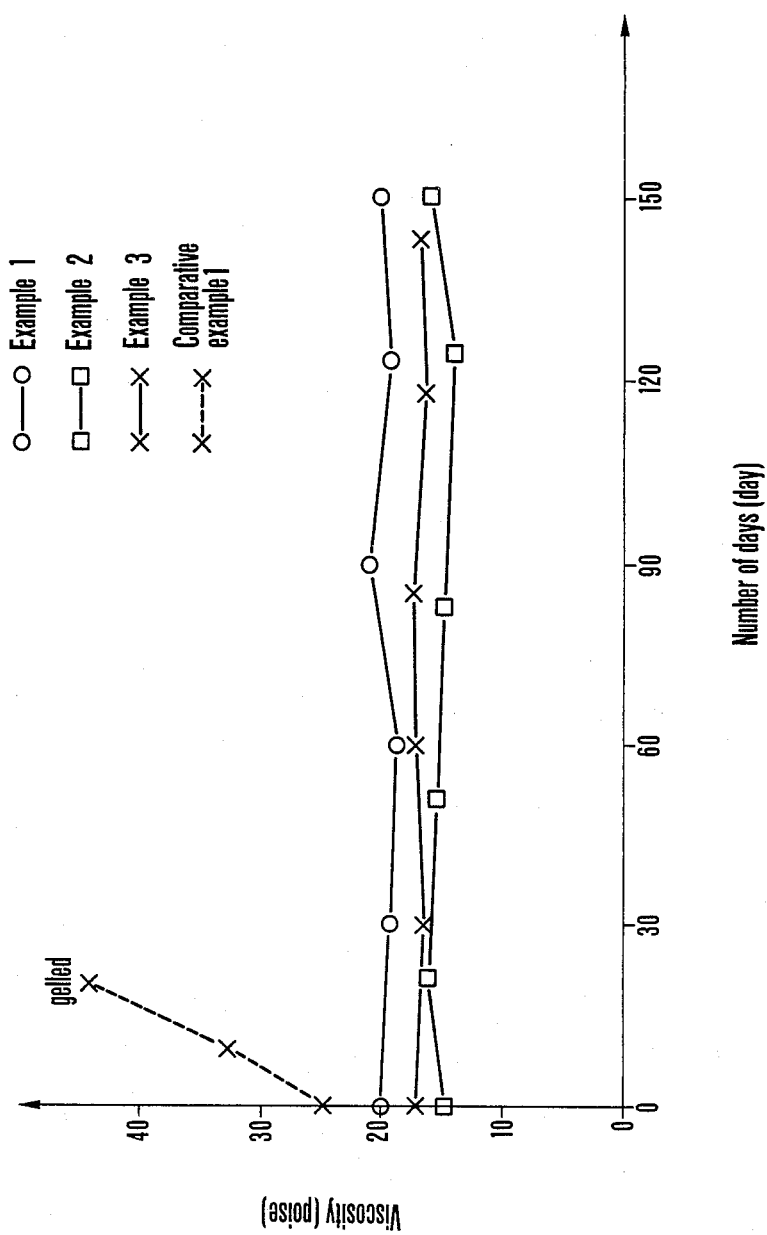

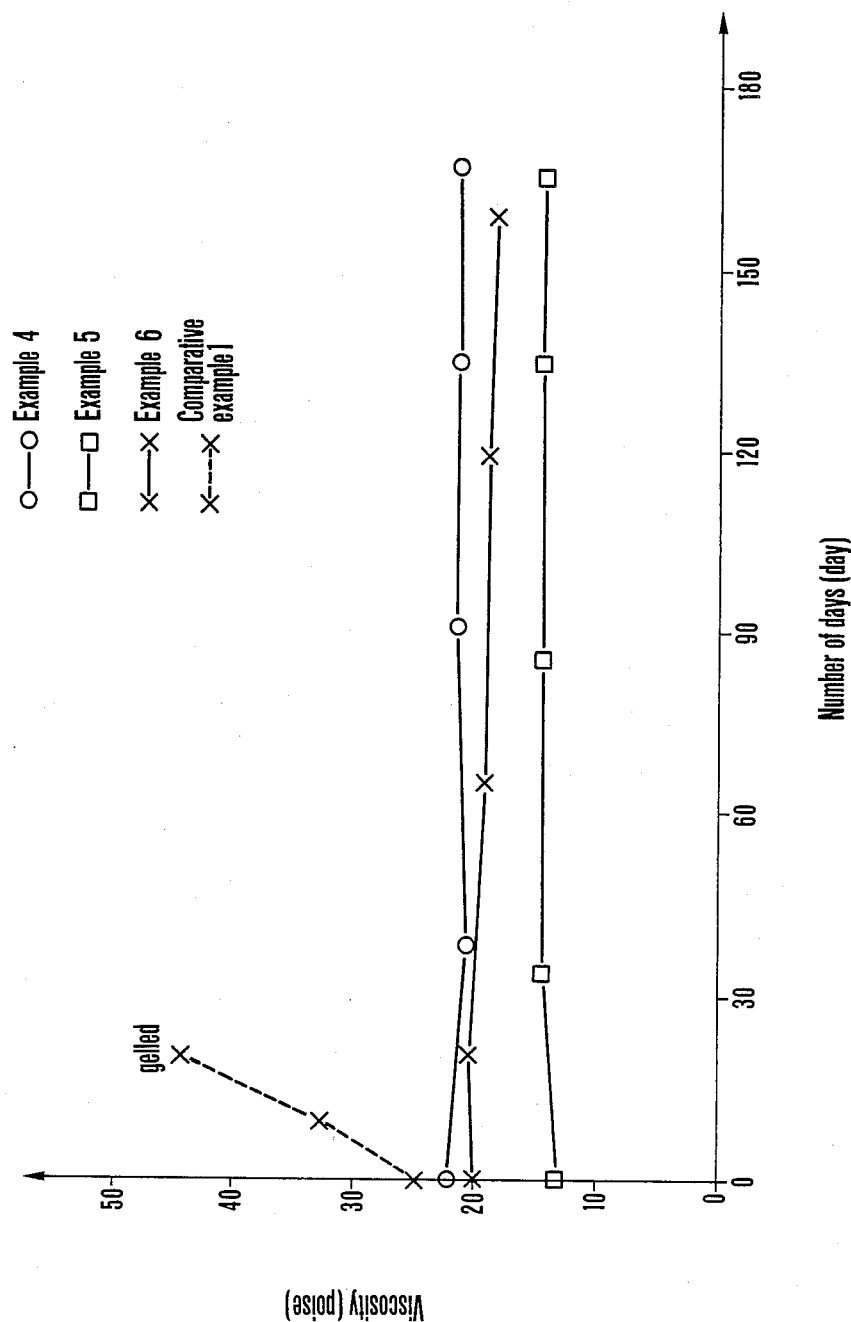

PROCESS FOR PRODUCING POLYAMIDE ACID HAVING SILOXANE BONDS AND POLYIMIDE HAVING SILOXANE BONDS AND ISOINDOLOQUINAZOLINEDIONE RINGS

BACKGROUND OF THE INVENTION

This invention relates to a process for producing polyamide acid having siloxane bonds and polyimide having siloxane bonds and isoindoloquinazolinedione rings.

In the prior art, as insulating films for electronic parts, typically semiconductors, polyimides having excellent heat resistance and electrical insulating property have been widely applied. Polyimide can be generally obtained by reacting a diamide with a tetracarboxylic dianhydride in an organic solvent to form a polyamide acid which is the precursor of a polyimide, and subjecting this to heating dehydration ring closure. A typical example known in the art is a polyamide acid represented by the following formula (III):

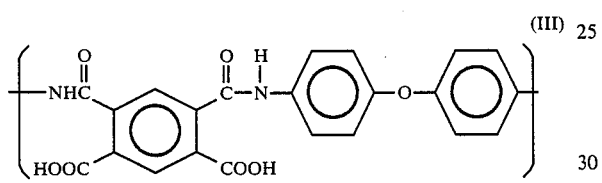
(III)

obtained from pyromellitic dianhydride and diaminodiphenyl ether, which can be subjected to dehydration ring closure by heating to give a polyimide represented by the formula (IV) shown below:

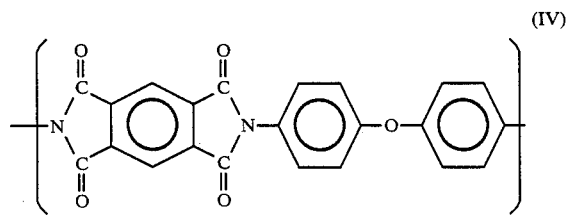
(IV)

However, the polyamide acid having this structural unit is low in solubility in solvents, and therefore, it is difficult to prepare a solution of low viscosity at high concentration and, even if temporarily be made, there has been involved the problem of markedly poor viscosity stability.

Also, since a high temperature of 300° C. or higher is required when formed into a polyimide by heating, it cannot be used on electronic parts or devices which are sensitive to high temperature treatment.

SUMMARY OF THE INVENTION

The present invention is intended to provide a process for producing a polyamide acid having siloxane bonds having a low viscosity at high solid concentration and yet excellent viscosity stability which can be formed into a polyimide at a relatively low temperature of 250° C., and also a process for producing a polyimide having at least one siloxane bond and at least one isoindoloquinazolinedione ring excellent in heat resistance and adhesiveness obtained therefrom.

The present invention concerns a process for producing a polyamide acid having at least one siloxane bond, which comprises carrying out the reaction of:

(a) a tetracarboxylic dianhydride having at least one siloxane bond of the formula:

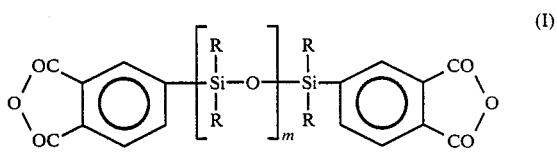
(I)

wherein R represents a monovalent hydrocarbon group and m is an integer of 1 or more;
(b) a diamine; and
(c) a diaminoamide compound of the formula (II):

(II)

wherein Ar represents an aromatic residue, Y represents $SO_2$ or CO, and one amino group and Y-$NH_2$ are positioned in ortho-position to each other,
and optionally
(d) an aromatic tetracarboxylic dianhydride; with the total amount of the diamine and the diaminoamide compound and the total amount of the tetracarboxylic dianhydride having at least one siloxane bond represented by the formula (I) and the aromatic tetracarboxylic dianhydride optionally contained being substantially equal moles,
and a process for producing a polyimide having at least one siloxane bond and at least one isoindoloquinazolinedione ring, which comprises subjecting a polyamide acid obtained by carrying out the reaction of:

(a) a tetracarboxylic dianhydride having at least one siloxane bond of the formula (I):

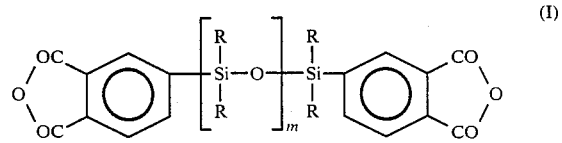
(I)

wherein R represents a monovalent hydrocarbon group and m is an integer of 1 or more;
(b) a diamine; and
(c) a diaminoamide compound of the formula (II):

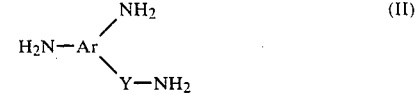
(II)

wherein Ar represents an aromatic residue, Y represents $SO_2$ or CO, and one amino group and Y-$NH_2$ are positioned in ortho-position to each other,
and optionally
(d) an aromatic tetracarboxylic dianhydride; with the total amount of the diamine and the diaminoamide compound and the total amount of the tetracarboxylic dianhydride having at least one siloxane bond represented by the formula (I) and the aromatic tetracarboxylic dianhydride optionally contained being substantially equal moles, to heating dehydration ring closure.

BRIEF DESCRIPTION OF THE DRAWINGS

FIG. 1 and FIG. 2 are graphs showing the tracing results of viscosity stabilities carried out in Examples and Comparative example, respectively.

DESCRIPTION OF THE PREFERRED EMBODIMENTS

In the formula (I) of the tetracarboxylic dianhydride to be used in the present invention, R represents an alkyl group having 1 to 13 carbon atoms or an aryl group.

More specifically, the tetracarboxylic dianhydride having a siloxane bond or bonds represented by the above formula (I) to be used in the present invention may include, for example,

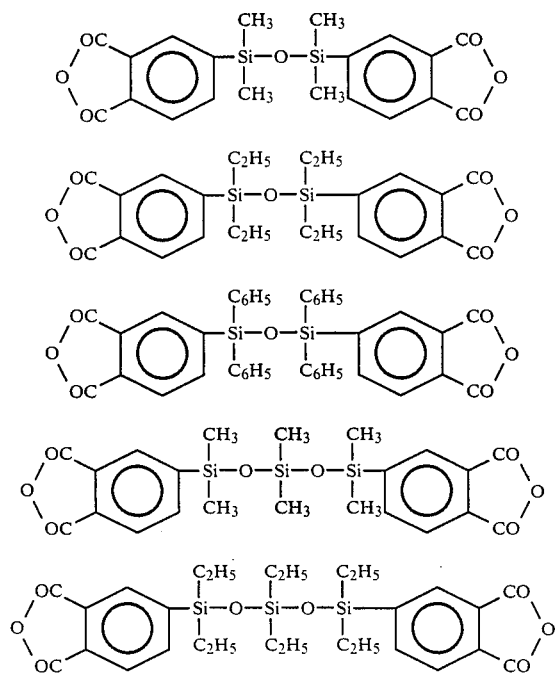

and the like.

These tetracarboxylic dianhydrides having a siloxane bond or bonds can be also used in a combination of two or more kinds. On the other hand, examples of the aromatic tetracarboxylic dianhydide to be used in the present invention may include pyromellitic dianhydride, 3,3',4,4'-benzophenonetetracarboxylic dianhydride, 3,3',4,4'-biphenyltetracarboxylic dianhydride, 3,3',4,4'-biphenylethertetracarboxylic dianhydride, 1,2,5,6-naphthalenetetracarboxylic dianhydride, 2,3,6,7-napthalenetetracarboxylic dianhydride, 2,3,5,6-pyridinetetracarboxylic dianhydride, 1,4,5,8-naphthalenetetracarboxylic dianhydride, 3,4,9,10-perilenetetracarboxylic dianhydride, 4,4'-sulfonyldiphthalic dianhydride, 3,3',4,4'-tetraphenylsilanetetracarboxylic dianhydride, 3,3',4,4'-perfluoroisopropylidenetetracarboxylic dianhydride, meta-terphenyl-3,4,3'',4''-tetracarboxylic dianhydride, para-terphenyl-3,4,3'',4''-tetracarboxylic dianhydride and the like. These aromatic tetracarboxylic dianhydrides may be also used in combination. The polyimide obtained by use of an aromatic tetracarboxylic dianhydride has improved solvent resistance.

As the diamine to be used in the present invention, there may be employed ethylenediamine, 1,3-propanediamine, tetramethylenediamine, pentamethylenediamine, hexamethylenediamine, heptamethylenediamine, octamethylenediamine, 4,4'-diaminodiphenylether, 1,4-diaminocyclohexane, 4,4'-diaminodiphenylmethane, 4,4'-diaminodiphenylsulfone, 4,4'-diaminodiphenylsulfide, benzine, meta-phenylenediamine, para-phenylenediamine, 2,2-bis(4-aminophenoxyphenyl)propane, 1,5-naphthalenediamine, 2,6-naphthalenediamine and the like. With respect to heat resistance, an aromatic diamine may be preferably used. These diamines may be used in combination of two or more kinds.

As the diaminoamide compound represented by the above formula (II) to be used in the present invention, there may be included, for example, 4,4'-diaminodiphenylether-3-sulfonamide, 3,4'-diaminodiphenylether-4-sulfonamide, 3,4'-diaminodiphenylether-3'-sulfonamide, 3,3'-diaminodiphenylether-4-sulfonamide, 4,4'-diaminodiphenylmethane-3-sulfonamide, 3,4'-diaminodiphenylmethane-4-sulfonamide, 3,4'-diaminodiphenylmethane-3'-sulfonamide, 3,3'-diaminodiphenylmethane-4-sulfonamide, 4,4'-diaminodiphenylsulfone-3-sulfonamide, 3,4'-diaminodiphenylsulfone-4-sulfonamide, 3,4'-diaminodiphenylsulfone-3'-sulfonamide, 3,3'-diaminodiphenylsulfone-4-sulfonamide, 4,4'-diaminodiphenylsulfide-3-sulfonamide, 3,4'-diaminodiphenylsulfide-4-sulfonamide, 3,3'-diaminodiphenylsulfide-4-sulfonamide, 3,4'-diaminodiphenylsulfide-3'-sulfonamide, 1,4-diaminobenzene-2-sulfonamide, 4,4'-diaminodiphenylether-3-carbonamide, 3,4'-diaminodiphenylether-4-carbonamide, 3,4'-diaminodiphenylether-3'-carbonamide, 3,3'-diaminodiphenylether-4-carbonamide, 4,4'-diaminodiphenylmethane-3-carbonamide, 3,4'-diaminodiphenylmethane-4-carbonamide, 3,4'-diaminodiphenylmethane-3'-carbonamide, 3,3'-diaminodiphenylmethane-4-carbonamide, 4,4'-diaminodiphenylsulfone-3-carbonamide, 3,4'-diaminodiphenylsulfone-4-carbonamide, 3,4'-diaminodiphenylsulfone-3'-carbonamide, 3,3'-diaminodiphenylsulfone-4-carbonamide, 4,4'-diaminodiphenylsulfide-3-carbonamide, 3,4'-diaminodiphenylsulfide-4-carbonamide, 3,3'-diaminodiphenylsulfide-4-carbonamide, 3,4'-diaminodiphenylsulfide-3'-carbonamide, 1,4-diaminobenzene-2-carbonamide and the like. These diaminoamide compounds may be used in combination of two or more kinds.

By use of the diaminoamide compound, heat resistance of the polyamide can be improved.

For increasing the molecular weight of the polyamide acid, the total amount of the diamine and the diaminoamide compound (in the case of using the diaminosiloxane as described above, this is included) and the total amount of the tetracarboxylic dianhydride having siloxane bond represented by the above formula (I) and the aromatic tetracarboxylic dianhydride are made substantially equal moles.

For the purpose of improving the adhesiveness of the polyimide, a diaminosiloxane represented by the formula (V):

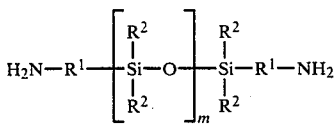

(V)

wherein
$R^1$ represents a divalent hydrocarbon group,
$R^2$ represents a monovalent hydrocarbon group, $R^1$, $R^2$ being either the same or different, and m is an integer of 1 or more,
can be used, and examples of the compound may include the following compounds:

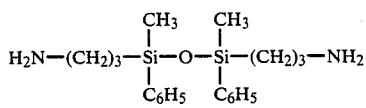

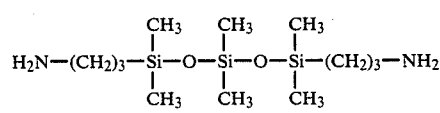

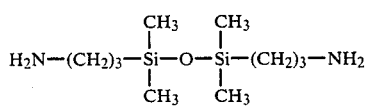

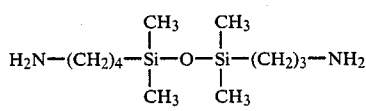

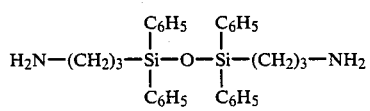

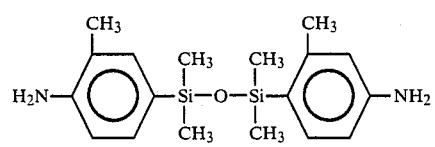

and the like.

The diaminosiloxane may be preferably used in an amount of 0.1 to 10 mole % based on the total amount of the diamine and the diaminoamide compound in aspect of heat resistance of the polyimide obtained.

In the process for producing the polyamide acid of the present invention, an inert solvent is used. The solvent is not required to dissolve all of the monomeric compounds as mentioned above, but particularly preferable solvent has the action of dissolving the polyamide acid formed.

As the inert solvent, there may be employed on or more of such solvents as N-methyl-2-pyrrolidone, N,N-dimethylacetamide, N,N-dimethylformamide, N,N-diethylformamide, dimethyl sulfoxide, hexamethylphosphoramide, tetramethylenesulfone, γ-butyrolactone, N-vinylpyrrolidone, etc.

In the present invention, the above tetracarboxylic dianhydride having at lease one siloxane bond, aromatic tetracarboxylic dianhydride, diamine and diaminoamide compounds are dissolved as well as possible in the above inert solvent, and the reaction mixture is stirred while being maintained at a temperature of about 80° C. or lower, particularly around room temperature or lower. By this operation, the reaction proceeds rapidly, and the viscosity of the reaction system is gradually elevated to form a polyamide acid. The polyamide acid thus obtained is stable as a varnish and useful as a commercial product, and can be used for obtaining a polyimide having at least one siloxane bond and at least one isoindoloquinazolinedione ring.

When the polyamide acid is subjected to heat treatment at a relatively low temperature of 100° to 350° C., preferably 100° to 250° C. for 30 minutes to one hour, dehydration ring closure is effected to give a polyimide having at least one siloxane bond and at least one isoindoloquinazolinedione ring. The dehydration ring closure reaction may be conducted by use of an acetic anhydride, a tertiary amine, dicyclohexylcarbodiimide phosphate, etc. as the dehydration agent. The above polyamide acid may be cast onto a glass plate, etc. and dried to form a film, which may be then subjected to heating dehydration ring closure reaction.

EXAMPLES

The present invention is described by referring to Examples.

EXAMPLE 1

A one liter three-necked flask equipped with a thermometer, a stirrer and a calcium chloride pipe was charged with 19.0 g (0.095 mole) of 4,4'-diaminodiphenyl ether, 1.2 g (0.005 mole) of 4,4'-diaminodiphenylether-3-carbonamide in 189 g of N,N-dimethylacetamide, and the mixture was well stirred. To this mixture were gradually added 42.7 g (0.1 mole) of 1,3-bis(3,4-dicarboxyphenyl)-1,1,3,3-tetramethyldisiloxane dianhydride. Stirring was continued for 7 hours after completion of the addition to obtain a solution of a polyamide acid having at least one siloxane bond.

The solution of the polyamide acid had a concentration of non-volatiles of 25% by weight and a viscosity of 1100 poise (25° C.). Next, the solution of the polyamide acid was heated at a temperature around 80° C. for control of viscosity, whereby the viscosity was lowered to 20 poise in 5 hours.

Next, the solution was applied on a glass plate and dried at 100° C. for 30 minutes, followed by heat curing in the range from 200° C. to 350° C. to give a film of a polyimide with good flexibility. Next, the film was evaluated according to the test methods shown below, and the results are shown in Table 1.

Test methods

1. Thermal decomposition initiation temperature

By use of 10 mg of the above film, it was measured at a temperature elevation rate of 10° C./min. in air with a differential thermal balance.

2. Weight reduction

By use of 70 mg of the above film and weight reduction after left to stand at 400° C./30 minutes was measured with the same apparatus as in 1.

3. Adhesiveness

On a silicon wafer, the above solution controlled in viscosity was applied by spin coating, the coating after drying at 100° C. for 30 minutes was thermally cured in the range from 200° to 350° C., and evaluation was performed according to the cross-cut test.

Also, the viscosity stability of the above solution controlled in viscosity under storage at 5° C. was monitored to obtain the results shown in FIG. 1.

EXAMPLE 2

Similarly as in Example 1, 19.44 g (0.09 mole) of 4,4'-diaminodiphenylsulfide, 1.2 g (0.005 mole) of 4,4'-diaminodiphenylether-3-carbonamide and 1.2 g (0.005 mole) of 1,3-bis-(aminopropyl)-tetramethyldisiloxane were dissolved in 216 g of N,N-dimethylacetamide, and to the resultant solution were gradually added 50 g (0.1 mole) of 1,5-bis(3,4-dicarboxyphenyl)-1,1,3,3,5,5-hexamethyltrisiloxane dianhydride. After completion of the addition, stirring was continued as such for 6 hours to obtain a solution of a polyamide acid having at least one siloxane bond. The solution of the polyamide acid obtained had a concentration of non-volatiles of 25% by mole) of pyromellitic acid dianhydride. After completion of the addition, stirring was continued as such at room temperature for 8 hours. The solution of the polyamide acid obtained had a concentration of non-volatiles of 20% by weight and a viscosity of 2000 poise (25° C.). Next, when the viscosity control was performed by heating the solution of the polyamide acid to a temperature around 80° C., the viscosity was lowered to 25 poise in 20 hours.

Next, the same evaluation was carried out as in Example 1 and the results are shown in Table 1. Also, the viscosity stability of the solution controlled in viscosity under storage at 5° C. was monitored to obtain the results shown in FIG. 1.

TABLE 1

| Curing temperature (°C.) | Weight reduction initiating temperature (°C.) | | | | Weight reduction percentage (%) | | | | Adhesiveness* | | | |
|---|---|---|---|---|---|---|---|---|---|---|---|---|
| | 200 | 250 | 300 | 350 | 200 | 250 | 300 | 350 | 200 | 250 | 300 | 350 |
| Example 1 | 421 | 419 | 423 | 420 | 4.2 | 4.0 | 4.0 | 3.9 | O | O | O | O |
| Example 2 | 425 | 425 | 426 | 426 | 3.8 | 3.7 | 3.7 | 3.6 | O | O | O | O |
| Example 3 | 432 | 433 | 433 | 433 | 3.4 | 3.4 | 3.3 | 3.3 | O | O | O | O |
| Comparative example 1 | 210 | 270 | 340 | 420 | 8.5 | 5.0 | 3.5 | 2.5 | X | X | X | X |

*By cross-cutting test, no peel-off was indicated to as O and peeled-off was indicated to as X.

weight and a viscosity of 1600 poise (25° C.). Next, when the viscosity control was performed by heating the solution of the polyamide acid to a temperature around 70° C., the viscosity was lowered to 15 poise in 7 hours.

Next, the solution was applied on a glass substrate and dried at 100° C. for 30 minutes, followed by curing in the range from 200° to 350° C. to give a film of a polyimide, which was evaluated similarly as in Example 1 to obtain the results shown in Table 1.

Also, the viscosity stability of the solution controlled in viscosity under storage at 5° C. was monitored to obtain the results shown in FIG. 1.

EXAMPLE 3

Similarly as in Example 1, 15.39 g (0.14 mole) of paraphenylenediamine and 1.82 g (0.007 mole) of 4,4'-diaminodiphenylether-3-carbonamide were dissolved in 239.7 g of N,N-dimethylacetamide, and to the resultant solution were gradually added 62.7 g (0.147 mole) of 1,3-bis(3,4-dicarboxyphenyl)-1,1,3,3-tetramethyldisiloxane dianhydride. After completion of the addition, stirring was continued as such for 5 hours to obtain a solution of a polyamide acid having siloxane bonds. The solution of the polyamide acid obtained had a concentration of non-volatiles of 25% by weight and a viscosity of 2000 poise (25° C.). Next, when the viscosity control was performed by heating the solution of the polyamide acid to a temperature around 80° C., the viscosity was lowered to 17 poise in 5 hours.

Next, the solution was applied on a glass substrate and dried at 100° C. for 30 minutes, followed by curing in the range from 200° to 350° C. to give a film of a polyimide, which was evaluated similarly as in Example 1 to obtain the results shown in Table 1.

Also, the viscosity stability of the solution controlled in viscosity under storage at 5° C. was monitored to obtain the results shown in FIG. 1.

COMPARATIVE EXAMPLE 1

4,4'-Diaminodiphenylether (20 g, 0.1 mole) was dissolved in 167.2 g of N,N-dimethylacetamide, and to the resultant solution were gradually added 21.8 g (0.1

In the above Table, weight reduction initiation temperature and weight reduction percentage are both constant at curing temperature in the range from 200° to 350° C. This fact shows that the polyamide acid produced according to the present invention can undergo dehydration ring closure by curing at 200° C. to become a thermally stable polyimide.

EXAMPLE 4

A one liter three-necked flask equipped with a thermometer, a stirrer and a calcium chloride pipe was charged with 76.1 g (0.38 mole) of 4,4'-diaminodiphenyl ether and 4.9 g (0.02 mole) of 4,4'-diaminodiphenylether-3-carbonamide in 692 g of N,N-dimethylacetamide, and the mixture was well stirred. To this mixture were gradually added 85.3 g (0.2 mole) of 1,3-bis(3,4-dicarboxyphenyl)-1,1,3,3-tetramethyldisiloxane dianhydride, 64.4 g (0.2 mole) of 3,3',4,4'-benzophenonetetracarboxylic dianhydride. Stirring was continued for 7 hours after completion of the addition to obtain a solution of a polyamide acid having at least one siloxane bond.

The solution of the polyamide acid had a concentration of non-volatiles of 25% by weight and a viscosity of 1700 poise (25° C.). Next, the solution of the polyamide acid was heated at a temperature around 80° C. for control of viscosity, whereby the viscosity was lowered to 22 poise in 7 hours.

Next, the solution was applied on a glass plate and dried at 100° C. for 30 minutes, followed by heat curing in the range from 200° C. to 350° C. to give a film of a polyimide with good flexibility, which was evaluated similarly as in Example 1 to obtain the results shown in Table 2.

Also, the viscosity stability of the above solution controlled in viscosity under storage at 5° C. was monitored to obtain the results shown in FIG. 2.

EXAMPLE 5

Similarly as in Example 4, 77.8 g (0.36 mole) of 4,4'-diaminodiphenylsulfide, 4.9 g (0.02 mole) of 4,4'-diaminodiphenylether-3-carbonamide and 5.0 g (0.02 mole) of 1,3-bis-(aminopropyl)-tetramethyldisiloxane were dissolved in 750 g of N,N-dimethylacetamide, and under storage at 5° C. was monitored to obtain the results shown in FIG. 2.

TABLE 2

| Curing temperature (°C.) | Weight reduction initiating temperature (°C.) | | | | Weight reduction percentage (%) | | | | Adhesiveness* | | | |
|---|---|---|---|---|---|---|---|---|---|---|---|---|
| | 200 | 250 | 300 | 350 | 200 | 250 | 300 | 350 | 200 | 250 | 300 | 350 |
| Example 4 | 430 | 432 | 429 | 430 | 4.0 | 4.0 | 4.1 | 3.9 | O | O | O | O |
| Example 5 | 420 | 420 | 421 | 423 | 4.5 | 4.3 | 4.3 | 4.2 | O | O | O | O |
| Example 6 | 425 | 427 | 429 | 429 | 3.9 | 3.8 | 3.8 | 3.7 | O | O | O | O |
| Comparative example 1 | 210 | 270 | 340 | 420 | 8.5 | 5.0 | 3.5 | 2.5 | X | X | X | X |

*By cross-cutting test, no peel-off was indicated to as O and peeled-off was indicated to as X.

to the resultant solution were gradually added 153.6 g (0.36 mole) of 1,3-bis(3,4-dicarboxyphenyl)-1,1,3,3-tetramethyldisiloxane dianhydride and 8.7 g (0.04 mole) of pyromellitic dianhydride. After completion of the addition, stirring was continued as such for 6 hours to obtain a solution of a polyamide acid having at least one siloxane bond. The solution of the polyamide acid obtained had a concentration of non-volatiles of 25% by weight and a viscosity of 2000 poise (25° C.). Next, when the viscosity control was performed by heating the solution of the polyamide acid to a temperature around 80° C., the viscosity was lowered to 13 poise in 8 hours.

Next, the solution was applied on a glass substrate and dried at 100° C. for 30 minutes, followed by curing in the range from 200° to 350° C. to give a film of a polyimide, which was evaluated similarly as in Example 1 to obtain the results shown in Table 2. Also, the viscosity stability of the solution controlled in viscosity under storage at 5° C. was monitored to obtain the results shown in FIG. 2.

EXAMPLE 6

Similarly as in Example 4, 41.0 g (0.38 mole) of paraphenylenediamine and 4.9 g (0.02 mole) of 4,4'-diaminodiphenylether-3-carbonamide were dissolved in 716.5 g of N,N-dimethylacetamide, and to the resultant solution were gradually added 180 g (0.36 mole) of 1,5-bis(3,4-dicarboxyphenyl)-1,1,3,3,5,5-hexamethyltrisiloxane dianhydride and 12.9 g (0.04 mole) of 3,3',4,4'-benzophenonetetracarboxylic acid dianhydride. After completion of the addition, stirring was continued as such for 5 hours to obtain a solution of a polyamide acid having siloxane bonds. The solution of the polyamide acid obtained had a concentration of non-volatiles of 25% by weight and a viscosity of 1300 poise (25° C.). Next, when the viscosity control was performed by heating the solution of the polyamide acid to a temperature around 80° C., the viscosity was lowered to 20 poise in 7 hours.

Next, the solution was applied on a glass substrate and dried at 100° C. for 30 minutes, followed by curing in the range from 200° to 350° C. to give a film of polyimide, which was evaluated similarly as in Example 1 to obtain the results shown in Table 2.

Also, the viscosity stability of the solution controlled in viscosity under storage at 5° C. was monitored to obtain the results shown in FIG. 2.

For reference, the same polyamide acid in Comparative example 1 was prepared. When the viscosity control was performed by heating the solution of the polyamide acid to a temperature around 80° C., the viscosity was lowered to 25 poise in 20 hours.

Next, the same evaluation was carried out as in Example 1 and the results are shown in Table 1. Also, the viscosity stability of the solution controlled in viscosity under storage at 5° C. was monitored to obtain the results shown in FIG. 2.

In the above Table, weight reduction initiation temperature and weight reduction percentage are both constant at curing temperature in the range from 200° to 350° C. This fact shows that the polyamide acid produced according to the present invention can undergo dehydration ring closure by curing at 200° C. to become a thermally stable polyimide.

The polyamide acid obtained by the production process of the present invention has lower viscosity at higher concentration than the polyamide acid known in the prior art, and yet is excellent in viscosity stability over a long term and can be formed into a polyimide at a relatively lower temperature of 250° C. or lower. The polymer thus obtained has excellent heat resistance and adhesiveness.

The polyamide acid and the polyamide obtained by the present invention are applicable for interlayer insulating films, surface protective films of various electronic parts, binders of metal paste, etc.

We claim:

1. A process for producing a polyamide acid having at least one siloxane bond, which comprises carrying out the reaction of:
   (a) a tetracarboxylic dianhydride having at least one siloxane bond of the formula:

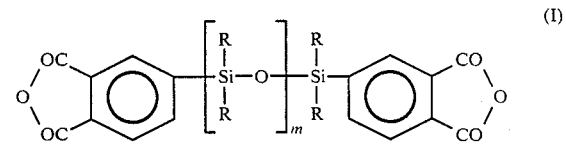

(I)

wherein R represents a monovalent hydrocarbon group and m is an integer of 1 or more;
   (b) a diamine; and
   (c) a diaminoamide compound of the formula (II):

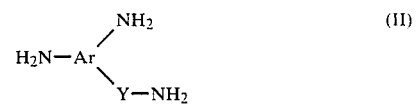

(II)

wherein Ar represents an aromatic residue, Y represents $SO_2$ or CO, and one amino group and Y-$NH_2$ are positioned in ortho-position to each other, with the total amount of the diamine and the diaminoamide compound and the total amount of the tetracarboxylic dianhydride having at least one siloxane bond represented by the formula (I) being substantially equal moles.

2. The process for producing a polyamide acid according to claim 1, wherein said reaction is carried out further presence of:

(d) an aromatic tetracarboxylic dianhydride.

3. The process for producing a polyamide acid according to claim 1, wherein the R in the formula (I) is an alkyl group having 1 to 13 carbon atoms or an aryl group.

4. The process for producing a polyamide acid according to claim 1, wherein said diamine is selected from the group consisting of ethylenediamine, 1,3-propanediamine, tetramethylenediamine, pentamethylenediamine, hexamethylenediamine, heptamethylenediamine, octamethylenediamine, 4,4'-diaminodiphenylether, 1,4-diaminocyclohexane, 4,4'-diaminodiphenylmethane, 4,4'-diaminodiphenylsulfone, 4,4'-diaminodiphenylsulfide, benzine, meta-phenylenediamine, para-phenylenediamine, 2,2-bis(4-aminophenoxyphenyl)propane, 1,5-naphthalenediamine and 2,6-naphthalenediamine.

5. The process for producing a polyamide acid according to claim 1, wherein said diaminoamide compound is selected from the group consisting of a sulfonamide or carbonamide of diaminodiphenylether, diaminodiphenylmethane, diaminodiphenylsulfone, diaminodiphenylsulfide and diaminobenzene.

6. The process for producing a polyamide acid according to claim 2, wherein said aromatic tetracarboxylic acid dianhydride, is selected from the group consisting of pyromellitic dianhydride, 3,3',4,4'-benzophenonetetracarboxylic dianhydride, 3,3',4,4'-biphenyltetracarboxylic dianhydride, 3,3',4,4'-biphenylethertetracarboxylic dianhydride, 1,2,5,6-naphthalenetetracarboxylic dianhydride, 2,3,6,7-naphthalenetetracarboxylic dianhydride, 2,3,5,6-pyridinetetracarboxylic dianhydride, 1,4,5,8-naphthalenetetracarboxylic dianhydride, 3,4,9,10-perilenetetracarboxylic dianhydride, 4,4'-sulfonyldiphthalic dianhydride, 3,3',4,4'-tetraphenylsilanetetracarboxylic dianhydride, 3,3',4,4'-perfluoroisopropylidenetetracarboxylic dianhydride, meta-terphenyl-3,4,3'',4''-tetracarboxylic dianhydride and para-terphenyl-3,4,3'',4''-tetracarboxylic dianhydride.

7. A process for producing a polyimide having at least one siloxane bond and at least one isoindoloquinazolinedione ring, which comprises subjecting a polyamide acid obtained by carrying out the reaction of:

(a) a tetracarboxylic dianhydride having at least one siloxane bond of the formula (I):

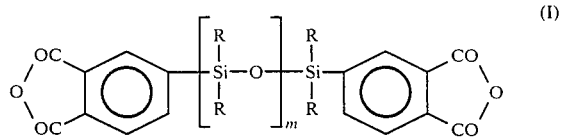

wherein R represents a monovalent hydrocarbon group and m is an integer of 1 or more;

(b) a diamine; and
(c) a diaminoamide compound of the formula (II):

wherein Ar represents an aromatic residue, Y represents $SO_2$ or CO, and one amino group and Y-NH$_2$ are positioned in ortho-position to each other, with the total amount of the diamine and the diaminoamide compound and the total amount of the tetracarboxylic dianhydride having at least one siloxane bond represented by the formula (I) being substantially equal moles, to heating dehydration ring closure.

8. The process for producing a polyimide according to claim 7, wherein the reaction is carried out further presence of (d) an aromatic tetracarboxylic dianhydride.

9. The process for producing a polyimide according to claim 7, wherein the R in the formula (I) is an alkyl group having 1 to 13 carbon atoms or an aryl group.

10. The process for producing a polyimide according to claim 7, wherein said diamine is selected from the group consisting of ethylenediamine, 1,3-propanediamine, tetramethylenediamine, pentamethylenediamine, hexamethylenediamine, heptamethylenediamine, octamethylenediamine, 4,4'-diaminodiphenylether, 1,4-diaminocyclohexane, 4,4'-diaminodiphenylmethane, 4,4'-diaminodiphenylsulfone, 4,4'-diaminodiphenylsulfide, benzine, meta-phenylenediamine, para-phenylenediamine, 2,2-bis(4-aminophenoxyphenyl)propane, 1,5-naphthalenediamine and 2,6-naphthalenediamine.

11. The process for producing a polyimide according to claim 7, wherein said diaminoamide compound is selected from the group consisting of a sulfoneamide or carbonamide of diaminodiphenylether, diaminodiphenylmethane, diaminodiphenylsulfone, diaminodiphenylsulfide and diaminobenzene.

12. The process for producing a polyimide according to claim 8, wherein said aromatic tetracarboxylic acid dianhydride is selected from the group consisting of pyromellitic dianhydride, 3,3',4,4'-benzophenonetetracarboxylic dianhydride, 3,3',4,4'-biphenyltetracarboxylic dianhydride, 3,3',4,4'-biphenylethertetracarboxylic dianhydride, 1,2,5,6-naphthalenetetracarboxylic dianhydride, 2,3,6,7-naphthalenetetracarboxylic dianhydride, 2,3,5,6-pyridinetetracarboxylic dianhydride, 1,4,5,8-naphthalenetetracarboxylic dianhydride, 3,4,9,10-perilenetetracarboxylic dianhydride, 4,4'-sulfonyldiphthalic dianhydride, 3,3',4,4'-tetraphenylsilanetetracarboxylic dianhydride, 3,3',4,4'-perfluoroisopropylidenetetracarboxylic dianhydride, meta-terphenyl-3,4,3'',4''-tetracarboxylic dianhydride and para-terphenyl-3,4,3'',4''-tetracarboxylic dianhydride.

* * * * *